United States Patent [19]

Gamon et al.

[11] Patent Number: 4,918,131
[45] Date of Patent: Apr. 17, 1990

[54] AQUEOUS SILICONE DISPERSIONS

[75] Inventors: Norbert Gamon, Seevetal; Karl Braunsperger, Burghausen, both of Fed. Rep. of Germany

[73] Assignee: Wacker-Chemie GmbH, Munich, Fed. Rep. of Germany

[21] Appl. No.: 230,543

[22] Filed: Aug. 10, 1988

[30] Foreign Application Priority Data

Aug. 14, 1987 [DE] Fed. Rep. of Germany ....... 3727180

[51] Int. Cl.$^4$ ............................................. C08L 83/06
[52] U.S. Cl. .................................... 524/500; 524/588; 524/501; 525/477
[58] Field of Search ............... 524/500, 501, 837, 588; 525/477

[56] References Cited

U.S. PATENT DOCUMENTS

| | | | |
|---|---|---|---|
| 3,433,780 | 3/1969 | Cekada | 524/158 |
| 4,424,297 | 1/1984 | Bey | 524/837 |
| 4,568,718 | 2/1986 | Huebner | 524/837 |
| 4,584,341 | 4/1986 | Huebner | 524/837 |
| 4,661,556 | 4/1987 | Huebner | 524/837 |
| 4,816,506 | 3/1989 | Gamon | 524/588 |

*Primary Examiner*—C. Warren Ivy

[57] ABSTRACT

The aqueous silicone dispersions of the present invention contain (a) polydiorganosiloxanes having terminal hydroxyl groups, (b) an (organo)metallic compound, and (c) a high-molecular weight, toluene-insoluble silicone resin having a mean particle size of at least 200 nm.

10 Claims, No Drawings

AQUEOUS SILICONE DISPERSIONS

The present invention relates to aqueous silicone dispersions and particularly to aqueous silicone dispersions, which upon evaporation of the solvent are capable of vulcanizing to form elastomers. More specifically, the invention relates to aqueous silicone dispersions containing $\alpha,\omega$-dihydroxypolyorganosiloxanes, silicone resins and (organo)metallic compounds.

BACKGROUND OF THE INVENTION

A latex prepared from an essentially linear silicone and a silsesquioxane having a grain size of from 1 to 100 nm is described in U.S. Pat. No. 3,355,406 to Cekada, Jr. Stable silicone emulsions comprising $\alpha,\omega$-dihydroxypolydiorganosiloxane, a low-molecular-weight silicone resin, a catalyst and additional substances are described in European Pat. No. EPA 143,877 (published June 2, 1985, W. Grape et al).

The present invention differs from U.S. Pat. No. 3,355,406 in that the silsesquioxane (silicone resin) has a particle size of at least 200 nm, which significantly simplifies the preparation thereof. In contrast to European Pat. No. EP-A 143,877, a high-molecular-weight silicone resin is employed in the present invention, which reduces the amount of emulsifier and thixotropic agent required.

It is, therefore, an object of the present invention to provide novel aqueous silicone dispersions which are stable on storage over a long period of time. Another object of the present invention is to provide aqueous silicone dispersions containing small amounts of emulsifiers and/or thixotropic agents. Still another object of the present invention is to provide aqueous silicone dispersions which may be prepared in a simple and inexpensive manner. A further object of the present invention is to provide aqueous silicone dispersions which vulcanize to form elastomers after evaporation of the water, that adhere to the substrates upon which they are applied prior to vulcanization. A still further object of the present invention is to provide silicone coatings and sealants from aqueous silicone dispersions which vulcanize to form elastomers upon evaporation of the solvent.

SUMMARY OF THE INVENTION

The foregoing objects and others which will become apparent from the following description are accomplished in accordance with this invention, generally speaking, by providing aqueous silicone dispersions containing (a) polydiorganosiloxanes having terminal hydroxyl groups, (b) an (organo)metallic compound, (c) high-molecular-weight, toluene-insoluble silicone resins having a mean particle size of at least 200 nm, in which the silicone resins (c) are preferable of such a high molecular weight that they have no softening point.

DESCRIPTION OF THE INVENTION

The polydiorganosiloxanes which can be used as starting materials for the dispersions of this invention and which contain terminal hydroxyl groups are preferably those of the formula $$HO-[SiR_2O]_n-H \qquad (I)$$

in which R represents the same or different hydrocarbon radicals having 1 to 18 carbon atoms and hydrocarbon radicals which are substituted by halogen atoms, amino groups, ether groups, ester groups, epoxy groups, mercapto groups, cyano groups or (poly)glycol radicals containing oxyethylene and/or oxypropylene units, and n represents an integer having a value of at least 200.

The polydiorganosiloxanes of formula (I) are either emulsified directly or prepared as an emulsion by polymerization or condensation of low-molecular-weight cyclic or linear polyorganosiloxanes having terminal hydroxyl groups. These processes are well known in the art. Although these are not shown in the above formula, up to 10 percent by weight of the siloxane units of formula (I) may be units of the formula $R_3SiO_{\frac{1}{2}}$ or $RSiO_{3/2}$ where R is the same as above. These are generally present as contaminants which are more or less difficult to avoid.

Examples of hydrocarbon radicals represented by R are alkyl radicals, such as the methyl, ethyl, n-propyl, isopropyl, n-butyl, sec-butyl, t-butyl, n-pentyl and neopentyl radicals, isopentyl radicals, hexyl radicals, heptyl radicals, octyl radicals, decyl radicals, dodecyl radicals and octadecyl radicals; alkenyl radicals, such as the vinyl and allyl radicals; aryl radicals, such as phenyl and naphthyl radicals; aralkyl radicals, such as the benzyl radicals and $\alpha$- and $\beta$-phenyl radicals; alkaryl radicals, such as o-, m- and p-tolyl radicals and xylyl radicals; and araryl radicals, such as biphenylyl radicals.

Examples of substituted hydrocarbon radicals represented by R are halogenated radicals, such as the 3-chloropropyl radical, the 3,3,3-trifluoropropyl radical, chlorophenyl radicals, and hexafluoropropyl radicals, such as the 1-trifluoromethyl-2,2,2-trifluoroethyl radical; the 2-(perfluorohexyl)ethyl radical, the 1,1,2,2-tetrafluoroethoxypropyl radical, the 1-trifluoromethyl-2,2,2-trifluoroethoxypropyl radical, the perfluoro-isopropoxyethyl radical and the perfluoro-isopropoxypropyl radical; amino-substituted radicals, such as the N-(2-aminoethyl)-3-aminopropyl radical, the 3-aminopropyl radical and the 3-(cyclohexylamino)propyl radical; ether-functional radicals, such as the 3-methoxypropyl radical and the 3-ethoxypropyl radical; cyano-functional radicals, such as the 2-cyanoethyl radical; ester-functional radicals, such as the methacryloxypropyl radical; epoxy-functional radicals, such as the glycidoxypropyl radical; and sulphur-functional radicals, such as the 3-mercaptopropyl radical.

Preferred R radicals are hydrocarbon radicals having from 1 to 10 carbon atoms. At least 80 percent and more preferably at least 90 percent of the R radicals are methyl radicals. The average value for the number n in formula (I) is preferably selected so that the polydiorganosiloxane of formula (I) has a viscosity greater than 1,000 mPa.s, and more preferably greater than 10,000 mPa.s at 25° C.

The (organo)metallic compounds which can be used as condensation catalysts for the dispersions of this invention are preferably the salts of carboxylic acids, the alkoxides and halides of the metals Pb, Zn, Zr, Ti, Sb, Fe, Cd, Sn, Ba, Ca and Mn. (Organo)tin compounds of carboxylic acids having from 1 to 18 carbon atoms and (organo)tin halides, preferably organotin naphthenates, octoates, hexoates, laurates, acetates, bromides and chlorides, are especially preferred.

Examples of such (organo)tin compounds are tin(II) octoate, dibutyltin dilaurate, octyltin triacetate, dioctyltin dioctoate, dioctyltin diacetate, didecyltin diacetate, dibutyltin diacetate, dibutyltin dibromide, dioctyltin

dilaurate, and trioctyltin acetate. Diorganotin dicarboxylates, in particular dibutyltin dilaurates, dioctyltin dilaurate, dibutyltin diacetate, are especially preferred.

The high-molecular-weight, toluene-insoluble silicone resins which can be used in the dispersions of this invention and which have a mean particle size of at least 200 nm are, in particular, those of the formula

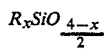

$$R_x SiO_{\frac{4-x}{2}}$$

in which R is the same as above, and x represents a number having an average value of from 0.5 to 1.6, and more preferably from 0.75 to 1.4.

Although it is not shown by formula (II), the silicone resin may contain, due to its preparation, up to 10 percent by weight of Si-bonded hydroxyl groups and/or alkoxy groups.

Preferred R radicals in formula (II) are methyl, ethyl, vinyl and phenyl radicals, especially methyl radicals.

The silicone resins which can be used according to this invention, i.e., in particular, those of formula (II) are insoluble in the conventional solvents, such as toluene and dichloromethane, whereas the low-molecular-weight resins are soluble in the conventional solvents.

The aqueous silicone dispersions of this invention preferably contain a maximum of 100 ppm by weight, and more preferably a maximum of 20 ppm by weight of siliconates based on the sum of the weights of the polydiorganosiloxane containing terminal hydroxyl groups, the (organo)metallic compound and the silicone resin employed. Preferably, the aqueous silicone dispersions are free of siliconates.

The aqueous silicone dispersions of this invention preferably contain fillers. Examples of fillers are reinforcing fillers, i.e., fillers having a BET surface area of at least 50 m$^2$/g, such as pyrogenically prepared silica, precipitated silica, alumina and carbon black; non-reinforcing fillers, i.e., fillers having a BET (Brunauer, Emett and Teller) surface area of less than 50 m$^2$/g, such as clay, quartz powder, chalk, mica, zinc oxide, titanium dioxide and others. Fillers are preferably used in maximum amounts of 150 parts by weight, based on 100 parts by weight of the organopolysiloxane containing terminal hydroxyl groups.

The high-molecular-weight silicone resins which can be used as starting materials in the dispersions of this invention, especially those of formula (II), can be prepared, for example, from low-molecular weight silicone resins, which can be prepared by solvolysis and condensation of a solution of the appropriate silanes with Si-bonded chlorine atoms in a water-immiscible solvent by means of an alcohol/water mixture. Such processes are described, for example, in W. Noll, Chemistry and Technology of Silicones, Academic Press, Orlando, etc., 1968, on pages 190 to 208. The high-molecular-weight silicone resins which can be used as starting materials for the emulsions of this invention are preferably prepared from the low-molecular-weight silicone resins by condensation of the low-molecular-weight silicone resins in a dispersion. The low-molecular-weight silicone resins can be dispersed without using organic solvents if their softening point is below 100° C. Otherwise, small amounts of organic solvents are necessary. The dispersions of the high-molecular-weight silicone resin can be prepared by adding a condensation catalyst to a dispersion of a relatively low-molecular-weight silicone resin and storing the mixture for a period of time, preferably at temperatures of from 0° C. to 100° C., and more preferably at temperatures of from 15° C. to 30° C. Suitable condensation catalysts are preferably acids, such as dodecylbenzenesulphonic acid or alkylsulphonic acids, bases, such as amines, alkali metal hydroxides, ammonium hydroxides and phosphonium hydroxides, and amphoteric compounds, such as the compounds mentioned as (organo)metallic compounds. If acids or bases are employed as the condensation catalysts, these are generally neutralized after storage.

The silicone resin dispersions thus prepared are milk-turbid and the silicone resin particles have a mean particle diameter of at least 200 nm. These silicone resin dispersions are stable on storage to a virtually unlimited extent, and after drying, form glassy, dry films which are insoluble in conventional solvents such as toluene and dichloromethane.

The dispersions of this invention are generally stabilized by emulsifiers. Cationic, anionic, ampholytic and nonionic emulsifiers can be used. These emulsifiers and the amounts thereof which are added are known to those skilled in the art. It is possible to use one type of emulsifier, for example, an anionic emulsifier, but it is also possible to use mixtures of at least two different types of emulsifiers, for example a mixture of at least one anionic emulsifier with at least one nonionic emulsifier. The emulsifiers can be added as such to the mixture to be dispersed or to be stabilized as a dispersion, but they can alternatively be formed in the mixture to be dispersed or to be stabilized as a dispersion by chemical reaction(s) from a precursor, for example, the corresponding acid, base or a salt of the actual emulsifier.

At least one anionic emulsifier is preferably present in the dispersion of this invention.

The anionic emulsifiers are preferably the salts of the surface-active sulphonic acids described in U. S. Pat. No. 3,294,725 which are used in the emulsion polymerization to form diorganosiloxanes which contain hydroxyl groups in the terminal units. The alkali metal salts or ammonium salts of the sulphonic acids are preferred, and more particularly the potassium salts. Specific examples of the sulphonic acids are benzenesulphonic acids having aliphatic substituents, naphthalenesulphonic acids having aliphatic substituents, aliphatic sulphonic acids, silylalkylsulphonic acids and diphenyl ether sulphonic acids having aliphatic substituents. It is also possible to use other anionic emulsifiers, for example, alkali metal sulphoricinoleates, sulphonated glycerol esters of fatty acids, salts of sulphonated monohydric alcohol esters, amides of aminosulphonic acids, for example, the sodium salt of oleylmethyltauride, alkali metal salts of sulphonated aromatic hydrocarbons, such as sodium alpha-naphthalenemonosulphonate, products of the condensation of naphthalenesulphonic acids with formaldehyde, and sulphates, such as ammonium lauryl sulphate, triethanolamine lauryl sulphate and sodium lauryl ether sulphate.

Nonionic emulsifiers are preferably used in addition to an anionic emulsifier. Examples of such nonionic emulsifiers are saponins, products of the addition of fatty acids and ethylene oxide, such as dodecanoates with tetraethylene oxide, products of the addition of ethylene oxide and sorbitan trioleate, products of the addition of phenolic compounds containing side chains with ethylene oxide, such as products of the addition of ethylene oxide and isododecylphenol, and imine derivatives, such as polymerized ethyleneamine, and products of the addition of alcohols and ethylene oxide, such as polyethylene glycol (10) isotridecyl ether.

Examples of cationic emulsifiers are fatty amines, quaternary ammonium compounds, quaternary compounds of pyridine, morpholine and imidazoline.

Examples of ampholytic emulsifiers are long-chain, substituted amino acids, such as N-alkyl-di(aminoethyl)glycine, N-alkyl-2-aminopropionate, and betaines, such as (3-acylaminopropyl)dimethylglycine and alkylimidazolium betaines.

Generally, 0.01 to 10, and more preferably from 0.15 to 7 parts by weight of (organo)metallic compound and from 1 to 150, and more preferably from 5 to 70 parts by weight of silicone resin are employed in the preparation of the dispersions of this invention, based on 100 parts by weight of polydiorganosiloxanes containing terminal hydroxyl groups.

The amount of emulsifier necessary for stabilizing the dispersions of this invention is generally dependent on the composition of the particular dispersion. Generally, from 1 to 20 percent by weight of emulsifier is sufficient, based on the weight of the dispersion, except for the water.

The silicone dispersions of this invention may contain additional components for modifying the properties of the dispersions or the elastomeric products obtained therefrom. In order to improve the adhesion of the dispersions of this invention, after evaporation of their solvent, to the substrate upon which the dispersions have been applied, adhesion promoters can be added. The use of amino-functional silanes, such as N-(2-aminoethyl)-3-aminopropyltrialkoxysilanes in which the alkoxy radical is a methoxy, ethoxy, n-propoxy, isopropoxy or butoxy radical have certain advantages in regard to promoting adhesion to a substrate.

Additional substances which may be present in the dispersions of this invention are plasticizers, such as α,ω-trimethylsiloxypolydimethylsiloxanes, anti-foaming agents, organic solvents, thixotropic agents and dispersants. Examples of thixotropic agents are carboxymethylcellulose and polyvinyl alcohol. Examples of dispersants are polyacrylic acid salts and polyphosphates. Some of the thixotropic agents and dispersants mentioned also have emulsifying properties, which means that they can be used as emulsifiers. Examples of organic solvents are hydrocarbons, such as petroleum ethers of various boiling ranges, n-pentane, n-hexane, mixtures of hexane isomers, toluene and xylene. Organic solvents may be employed up to a maximum amount of about 5 percent by weight, based on the weight of the dispersion, and more preferably organic solvents are not employed at all.

It is possible to use, as one component, one substance from each of the groups of substances mentioned above as possible components in the dispersions or as starting materials for the dispersions of this invention, but it is also possible to use a mixture of at least two different examples of these substances in the dispersions of this invention. Thus, for example, it is possible to use a mixture of at least two organopolysiloxanes which contain hydroxyl groups in the terminal units.

Solids contents greater than 80 percent by weight are achieved in the dispersions of this invention. The solids content is meant to include the weight of all the components of the dispersion, except for the water, and organic solvents(s), if used. The dispersions of this invention preferably have solids contents of from 20 to 85 percent by weight. Lower solids contents are, of course, possible, but impractical. The polydiorganosiloxanes which contain terminal hydroxyl groups are used as starting materials for the dispersions of this invention and the silicone resins are preferably emulsified or dispersed in water before being mixed with the components remaining in each case. This may also be of advantage for the (organo)metallic compound(s). It is also possible to mix two or more of the components mentioned above as possible starting materials for the aqueous silicone dispersions of this invention with one another in the solid phase and subsequently to disperse this mixture in water, unless this mixture is capable of vulcanization at room temperature.

The aqueous silicone dispersions of this invention can be employed for all purposes for which silicone dispersions have heretofore been used. After evaporation of the solvent, they can be vulcanized to form elastomers even at room temperature. They can be used, for example, as sealants, paints and as surface-coatings and as electroinsulating or electroconducting coatings, as hydrophobic, adhesive-repellent coating systems or as bases or additives for such systems. They form adherent coatings on paper, textiles, mineral construction materials, plastics and many other substrates.

In the following example, the amounts are by weight, unless otherwise specified. The emulsifier employed was polyethylene glycol (10) isotridecyl ether (identified as "E" in the examples). Unless otherwise indicated, the examples were carried out at a pressure of 0.10 MPa (abs.) and at room temperature, i.e., at about 22° C., or at the temperature produced on mixing the reactants at room temperature without additional heating or cooling.

(A) Dispersion of polydiorganosiloxane containing terminal hydroxyl groups:

An emulsion prepared from 1,400 g of an α,ω-dihydroxypolydimethylsiloxane having a viscosity of 100 mm²/s at 25° C., 30 g of a salt obtained by neutralization of dodecylbenzenesulphonic acid using N-methylethanolamine, 30 g of dodecylbenzenesulphonic acid and 540 g of water was neutralized using dimethylamine after storing for 20 hours at room temperature. The viscosity of the oil phase was about 1,600,000 mPa.s at 25° C.

(B) Dispersion of (organo)metallic compound:

An emulsion was prepared from 50 g of dibutyltin dilaurate, 5 g of "E" and 45 g of water.

(C) Silicone resin dispersion:

A dispersion prepared from 50 g of a silicone resin comprising units of the formula

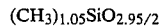

and still containing about 1 percent of toluene, 3 g of dodecylbenzenesulphonic acid salt and 47 g of water was acidified using 1 g of dodecylbenzenesulphonic acid, stored at room temperature for 1 week and then subsequently neutralized using N-methylethanolamine. The dispersion was milk-turbid and formed, after drying on a glass plate, a clear, glass-hard film which broke up into a white powder on mechanical load. The resin dispersed in this manner was insoluble in toluene and did not have a softening point.

EXAMPLE

A creamy, stable paste which vulcanized to form a dry elastomer within one day after application as a bead or film was obtained from 100 g of the polydiorganosiloxane dispersion (A), 25 g of silicone resin dispersion (C), 60 g of precipitated chalk and 1 g of (organo)metallic compound dispersion (B). After storing the paste for 3 days at room temperature (RT), 1 month at 40° C. and 3 months at 40° C., films of 2 mm thickness were produced, and the mechanical properties thereof were determined after storing for 14 days at room temperature. The results are illustrated in the following table.

TABLE

| Storage of the paste | Shore A Hardness | Tear resistance in N/mm$^2$ | Elongation at break in % | Tear Propagation resistance in N/mm | Tensile strength at 100% elongation in N/mm$^2$ |
|---|---|---|---|---|---|
| 3 days, RT | 32 | 0.91 | 600 | 3.4 | 0.5 |
| 1 month, 40° C. | 29 | 0.42 | 540 | 3.4 | 0.24 |
| 3 months, 40° C. | 27 | 0.33 | 420 | 2.0 | 0.18 |

What is claimed is:

1. Aqueous silicone dispersions consisting essentially of (a) polydiorganosiloxanes having the formula $$HO\text{---}(SiR_2O)_n\text{---}H$$

where R is selected from the group consisting of hydrocarbon radicals having from 1 to 18 carbon atoms, hydrocarbon radicals substituted with radicals selected from the group consisting of halogen atoms, amino radicals, ether radicals, ester radicals, epoxy radicals, mercapto radicals and cyano radicals and (poly)glycol radicals and n is an integer having a value of at least 200, and wherein said polydiorganosiloxane has a vicosity greater than 1000 mPa.s at 25° C., (b) an organometallic condensation catalyst, (c) a high-molecular-weight, toluene-insoluble silicone resin having a mean particle size of at least 200 nm and having the formula $$R_xSiO_{\frac{4-x}{2}}$$

where R is the same as above and x is a number having an average value of from 0.5 to 1.6 and (d) siliconates up to a maximum of 100 ppm by weight based upon the sum of the weights of polyorganosiloxanes (a), organometallic catalyst (b) and silicone resin (c).

2. The aqueous silicone dispersions of claim 1, wherein the dispersions also contain (e) a filler.

3. The aqueous silicone dispersions of claim 1, wherein the high-molecular-weight, toluene-insoluble silicone resin does not have a softening point.

4. The aqueous silicone dispersions of claim 2, wherein the high-molecular-weight, toluene-insoluble silicone resin does not have a softening point.

5. A process for preparing aqueous silicone dispersions which comprises dispersing in water (a) polydiorganosiloxanes having the formula $$HO\text{---}(SiR_2O)_n\text{---}H$$

where R is selected from the group consisting of hydrocarbon radicals having from 1 to 18 carbon atoms, hydrocarbon radicals substituted with radicals selected from the group consisting of halogen atoms, amino radicals, ether radicals, ester radicals, epoxy radicals, mercapto radicals and cyano radicals and (poly)glycol radicals and n is an integer having a value of at least 200, and wherein said polydiorganosiloxane has a vicosity greater than 1000 mPa.s at 25° C., (b) an organometallic condensation catalyst, (C) a high-molecular-weight, toluene-insoluble silicone resin having a mean particle size of at least 200 nm and having the formula $$R_xSiO_{\frac{4-x}{2}}$$

where R is the same as above and x is a number having an average value of from 0.5 to 16 and (d) siliconates up to a maximum of 100 ppm by weight based upon the sum of the weights of polyorganosiloxanes (a), organometallic catalyst (b) and silicone resin (c).

6. The process of claim 5, wherein the high-molecular-weight, toluene insoluble silicone resin does not have a softening point.

7. The process of claim 5, wherein an aqueous dispersion of polydiorganosiloxane (a) is mixed with an aqueous dispersion of an organometallic condensation catalyst (b) and an aqueous dispersion of the high-molecular-weight, toluene-insoluble silicone resin.

8. Aqueous silicone dispersions prepared in accordance with the process of claim 5.

9. Aqueous silicone dispersions prepared in accordance with the process of claim 6.

10. Aqueous silicone dispersions prepared in accordance with the process of claim 7.

* * * * *